(12) United States Patent
Lee et al.

(10) Patent No.: US 12,022,244 B2
(45) Date of Patent: Jun. 25, 2024

(54) ELECTRONIC APPARATUS AND OPERATING METHOD OF THE ELECTRONIC APPARATUS

(71) Applicant: SK hynix Inc., Icheon-si (KR)

(72) Inventors: Yoon Gyoo Lee, Icheon-si (KR); Seong Hee Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 143 days.

(21) Appl. No.: 17/577,166

(22) Filed: Jan. 17, 2022

(65) Prior Publication Data
US 2023/0050561 A1 Feb. 16, 2023

(30) Foreign Application Priority Data
Aug. 11, 2021 (KR) .......................... 10-2021-0106150

(51) Int. Cl.
*H04N 9/64* (2023.01)
*H04N 9/67* (2023.01)
*H04N 9/68* (2023.01)
*H04N 23/72* (2023.01)

(52) U.S. Cl.
CPC ............... *H04N 9/646* (2013.01); *H04N 9/67* (2013.01); *H04N 9/68* (2013.01); *H04N 23/72* (2023.01)

(58) Field of Classification Search
CPC ........... H04N 9/646; H04N 9/67; H04N 9/68; H04N 23/72; H04N 25/134; H04N 25/583; H04N 23/73; H04N 25/58; H04N 25/11; H04N 25/60
See application file for complete search history.

(56) References Cited

U.S. PATENT DOCUMENTS

| 7,911,518 B2 * | 3/2011 | Yosefin | H04N 25/533 348/297 |
| 2011/0261237 A1 * | 10/2011 | Yosefin | H04N 25/533 348/E9.002 |

FOREIGN PATENT DOCUMENTS

| KR | 101490653 B1 | 2/2015 |
| KR | 1020170018757 A | 2/2017 |

* cited by examiner

*Primary Examiner* — Twyler L Haskins
*Assistant Examiner* — Angel L Garces-Rivera
(74) *Attorney, Agent, or Firm* — William Park & Associates Ltd.

(57) ABSTRACT

An electronic apparatus includes: an image sensor for acquiring pixel values of first pixels sensed during a first exposure time and second pixels sensed during a second exposure time longer than the first exposure time; and a controller for outputting an output image acquired based on pixel values of the first pixels and a corrected saturated pixel value obtained by correcting a pixel value of a saturated pixel having a pixel value exceeding a threshold value among the second pixels, using a pixel value of at least one first pixel having a distance closest to a position of the saturated pixel among the first pixels.

15 Claims, 16 Drawing Sheets

FIG. 8B $$\begin{bmatrix} Ga\_PV\_out \\ R\_PV\_out \\ B\_PV\_out \\ Gb\_PV\_out \end{bmatrix} = \begin{bmatrix} C11 & C12 & C13 & C14 \\ C21 & C22 & C23 & C24 \\ C31 & C32 & C33 & C34 \\ C41 & C42 & C43 & C44 \end{bmatrix} \begin{bmatrix} Ya\_PV\_in \\ R\_PV\_in \\ B\_PV\_in \\ Yb\_PV\_in \end{bmatrix}$$

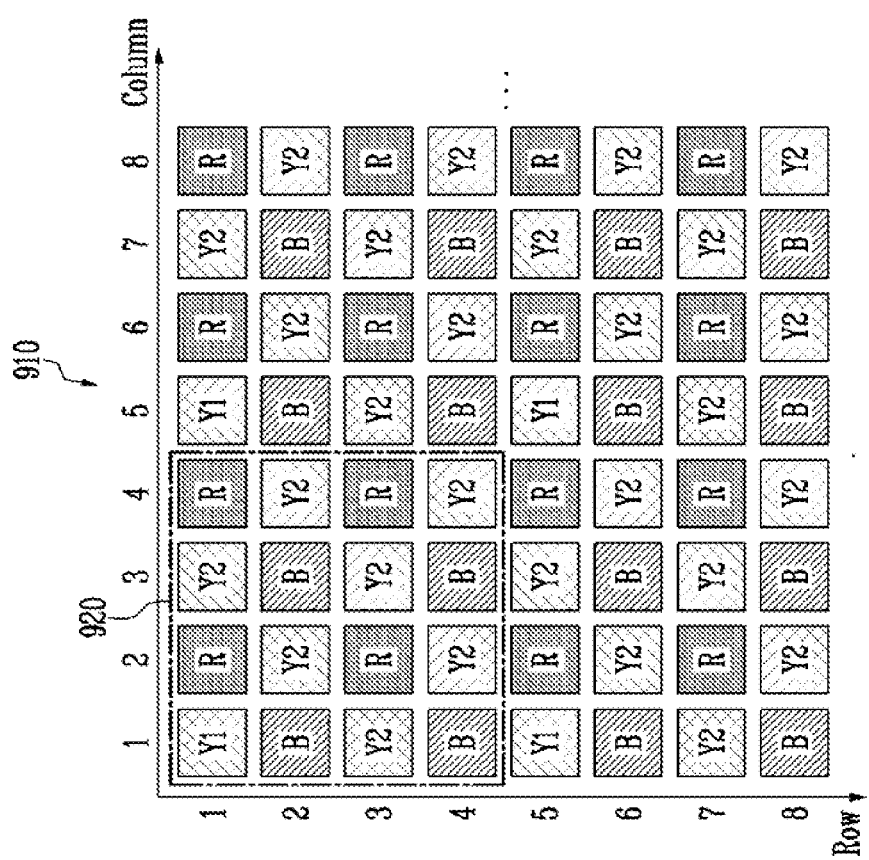

ELECTRONIC APPARATUS AND OPERATING METHOD OF THE ELECTRONIC APPARATUS

CROSS-REFERENCE TO RELATED APPLICATION

The present application claims priority under 35 U.S.C. § 119(a) to Korean patent application number 10-2021-0106150 filed on Aug. 11, 2021, in the Korean Intellectual Property Office, the entire disclosure of which is incorporated by reference herein.

BACKGROUND

1. Technical Field

The present disclosure generally relates to an electronic apparatus, and more particularly, to an electronic apparatus and an operating method thereof.

2. Related Art

Recently, with the development of computer and communication industries, demands for image sensors have increased in various electronic apparatuses including smart phones, digital cameras, game consoles, Internet of things, robots, surveillance cameras, medical cameras, autonomous vehicles, and the like.

In general, an image sensor uses an array structure in which red, green, and blue pixels are arranged. Recently, research for replacing a green pixel with a yellow pixel or the like has been conducted to acquire an image having reduced noise under a low illumination environment in which the amount of light is not sufficient.

However, in the case of the yellow pixel or the like, which has excellent sensitivity, there is a problem in that a pixel value rapidly reaches a maximum limit value under an illumination environment in which the amount of light is sufficient. This may result in a problem in that the color of an image reproduced through a combination of red, blue, and yellow pixels becomes inaccurate.

SUMMARY

In accordance with an aspect of the present disclosure, there may be provided an electronic apparatus including: an image sensor configured to acquire pixel values of first pixels sensed during a first exposure time and second pixels sensed during a second exposure time longer than the first exposure time; and a controller configured to output an output image acquired based on pixel values of the first pixels and a corrected saturated pixel value obtained by correcting a pixel value of a saturated pixel having a pixel value exceeding a threshold value among the second pixels, using a pixel value of at least one first pixel having a distance closest to a position of the saturated pixel among the first pixels.

In accordance with another aspect of the present disclosure, there may be provided a method of operating an electronic apparatus, the method including: acquiring pixel values of a plurality of pixels including first pixels sensed during a first exposure time and second pixels sensed during a second exposure time longer than the first exposure time; correcting pixel values of the first pixels, based on a ratio of the first exposure time and the second exposure time; detecting a saturated pixel having a pixel value exceeding a threshold value among the second pixels; correcting a saturated pixel value of the saturated pixel by using a corrected first pixel value of at least one first pixel having a distance closest to a position of the saturated pixel among the first pixels; and outputting an output image based on corrected first pixel values of the first pixels and the corrected saturated pixel value.

BRIEF DESCRIPTION OF THE DRAWINGS

Examples of embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 8A and 8B are diagrams illustrating a color conversion method in accordance with an embodiment of the present disclosure.

FIGS. 9A and 9B are diagrams illustrating a ratio of first pixels and second pixels in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Embodiments provide an electronic apparatus and an operating method of the electronic apparatus, which can improve color reproducibility of an image while reducing noise.

Figure 1:
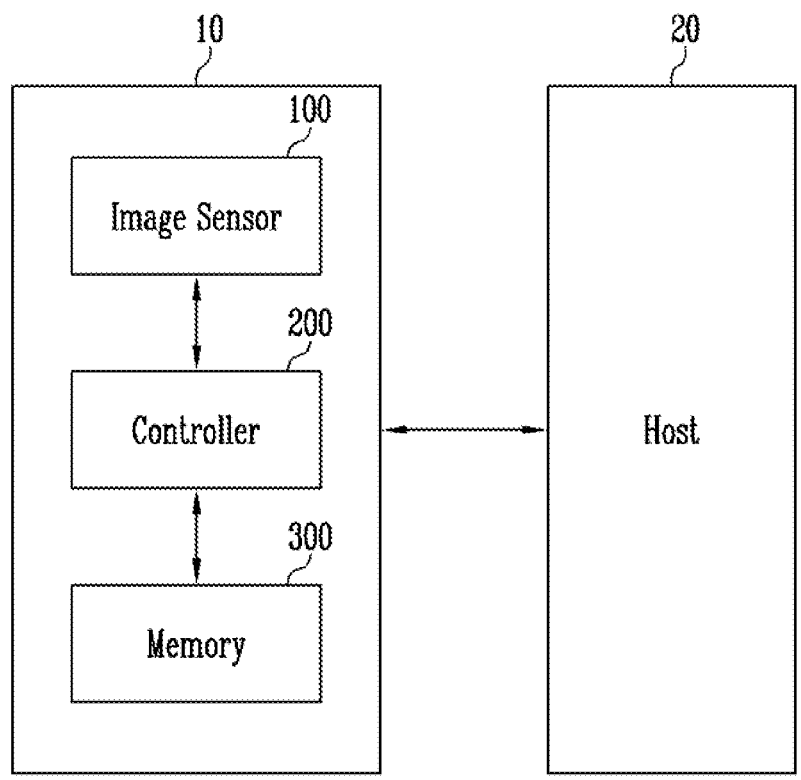
FIG. 1 is a diagram illustrating an electronic apparatus in accordance with an embodiment of the present disclosure.

FIG. 1 is a diagram illustrating an electronic apparatus in accordance with an embodiment of the present disclosure.

Referring to FIG. 1, the electronic apparatus 10 in accordance with the embodiment of the present disclosure may acquire an image. Also, the electronic apparatus 10 may store an output image obtained by processing the image, display the output image, or output the output image to an external device. The electronic apparatus 10 in accordance with the embodiment of the present disclosure may output the output image to a host 20 according to a request of the host 20.

In an embodiment, the electronic apparatus 10 may be implemented in the form of a packaged module, part or the like. The electronic apparatus 10 may be mounted in the host 20. The host 20 may be implemented as various electronic apparatuses. For example, the host 20 may be implemented as a digital camera, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, and the like.

In another embodiment, the electronic apparatus 10 may be implemented as an electronic apparatus separate from the host 20 may be an image pickup device, a digital camera, a camcorder, a closed-circuit television (CCTV), a webcam, a security camera, an industrial vision camera, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, a vehicle vision camera, a set top box, a game console, an electronic dictionary, an electronic book reader, a desktop computer, a server, an MP3 player, a smart medical device, a television, a digital video disk (DVD) player, an audio, a refrigerator, an air conditioner, a vacuum cleaner, an oven, a microwave oven, a washing machine, an air cleaner, a smart mirror, a smart window, an electronic key, an electronic frame, a digital advertising board, a security control panel, or the like. The wearable device may be a smart watch, a ring, a bracelet, an anklet, a necklace, glasses, a contact lens, a head-mounted device (HMD), a skin pad, an electronic tattoo, or a bio-implantable type circuit, or the like.

The electronic apparatus 10 may include an image sensor 100 and a controller 200.

The image sensor 100 may acquire an image. Specifically, the image sensor 100 may acquire an image when a command for controlling the image sensor 100 to acquire the image is received from the host 20 or the controller 200. To this end, the image sensor 100 may be implemented as a Charged Coupled Device (CCD) image sensor or a Complementary Metal Oxide Semiconductor (CMOS) image sensor. Also, the image sensor 100 may transfer the acquired image to the controller 200.

The image sensor 100 may acquire pixel data. The pixel data may include at least one of a position, a color, a pixel value, and an exposure time of a pixel. The pixel data may be respectively mapped to pixels included in an image.

The position of a pixel may represent a position at which the corresponding pixel among a plurality of pixels is arranged. The plurality of pixels may be distinguished from each other according to positions thereof. A pixel at a corresponding pixel may be selected through an address representing the position of the pixel.

The color of a pixel may represent a color of light with respect to the corresponding pixel. For example, the color of each of the plurality of pixels may be one of red, blue, and yellow. Meanwhile, a pixel having a red color may be briefly designated as a red pixel, a pixel having a blue color may be briefly designated as a blue pixel, and a pixel having a yellow color may be briefly designated as a yellow pixel.

The pixel value may represent brightness of light. For example, the brightness of light is brighter as the pixel value becomes larger. The pixel value may have a value within a range of data bits allocated according to a resolution of the image sensor 100. For example, when the data bits are 8 bits, the pixel value may have an integer value included in a range of 0 to 255. The pixel value may have a value less than 0 as a minimum limit value or value exceeding 255 as a maximum limit value.

The exposure time of a pixel may represent a time for which the corresponding pixel is exposed to light. In general, when the exposure time decreases, a sufficient amount of light is not incident, and therefore, noise may occur in the pixel. Meanwhile, when the exposure time increases, an amount of light, which is equal to or greater than a limit value, is incident, and therefore, it is highly likely that the pixel will be saturated.

In the present disclosure, pixels having various colors, which substitute for a green pixel, may be used. For example, the pixel substituting for the green pixel may be the yellow pixel. In another example, the pixel substituting for the green pixel may be a white pixel. In another example, the pixel substituting for the green pixel may be modified as pixels having various colors, such as a cyan pixel. The pixel substituting for the green pixel may have a color having a sensitivity higher than that of the green pixel. Accordingly, an image having a reduced noise in a low illumination environment can be acquired.

In the present disclosure, an individual exposure time may be set for each pixel. That is, each pixel may include a pixel value acquired in an exposure time unit set with respect to each pixel. In particular, a first exposure time and a second exposure time may be set according to positions with respect to yellow pixels (white pixels, or the like) having a high sensitivity. The second exposure time may be a time longer than the first exposure time. For example, the first exposure time 1 ms, and the second exposure time may be 4 ms. However, this is merely an embodiment, and the exposure times may be variously changed. Accordingly, color reproducibility can be improved by recovering a saturated pixel.

The image sensor 100 may acquire pixel values of a plurality of pixels. The plurality of pixels may include first pixels and second pixels. The first pixels may be pixels of which the first exposure time is set among the plurality of pixels. The second pixels may be pixels of which the second exposure time is set among the plurality of pixels. That is, the image sensor 100 may acquire pixel values of the first pixels sensing for the first exposure time and the second pixels sensing for the second exposure time. The second exposure time may be an exposure time longer than the first exposure time. In addition, the first pixels and the second pixels may be pixels having the same color. For example, the first pixel may be a yellow pixel of which the first exposure time is set among the plurality of pixels, and the second pixel may be a yellow pixel of which the second exposure time is set among the plurality of pixels.

The controller 200 may control overall operations of the electronic apparatus 10. For example, the controller 200 may control the image sensor 100 to adjust the exposure time or to perform an operation of acquiring image. In another example, the controller 200 may store data in a memory 300 or access data stored in the memory 300.

The controller 200 may output an output image acquired based on a corrected saturated pixel value obtained by correcting a pixel value of a saturated pixel, using a pixel value of at least one first pixel having a distance closest to the saturated pixel among the first pixels, and pixel values of the first pixels. The saturated pixel may be referred to as a saturation pixel. The corrected saturated pixel value may be referred to as a corrected saturation pixel value. The saturated pixel may be a second pixel having a pixel value exceeding a threshold value (or a reference value) among the second pixels. Each of the first pixels may be a pixel sensing a pixel value during the first exposure time, and each of the second pixels may be a pixel sensing a pixel value during the second exposure time. The second exposure time may be a time longer than the first exposure time.

Specifically, the controller 200 may correct the pixel values of the first pixels, based on a ratio of the first exposure time and the second exposure time. The controller 200 may detect a saturated pixel having a pixel value exceeding the threshold value among the second pixels. The controller 200 may correct a pixel value of the saturated pixel by using a corrected first pixel value of a first pixel closest to the position of the saturated pixel among the first pixels. The controller 200 may output an output image, based on corrected first pixel values of the first pixels and a corrected saturated pixel value of the saturated pixel.

In an embodiment, the electronic apparatus 10 may further include the memory 300. The memory 300 may be implemented as a nonvolatile memory device. For example, the memory 300 may be configured as various nonvolatile memory devices such as a Read Only Memory (ROM) capable of performing only reading of data, a One Time Programmable (OTP) memory capable of performing writing only once, an Erasable and Programmable ROM (EPROM) capable of erasing and writing stored data, a NAND Flash Memory, and a NOR flash memory.

The memory 300 may store a color conversion matrix. The color conversion matrix represents a matrix for converting a pixel value of a yellow pixel (white pixel, or the like) into a pixel value of a green pixel.

In accordance with the present disclosure, in an embodiment, there can be provided an electronic apparatus and an operating method thereof, which can improve the color reproducibility of an image while reducing noise of the image. Hereinafter, the electronic apparatus and the operating method of the electronic apparatus will be described in more detail with reference to the accompanying drawings.

Figure 2:
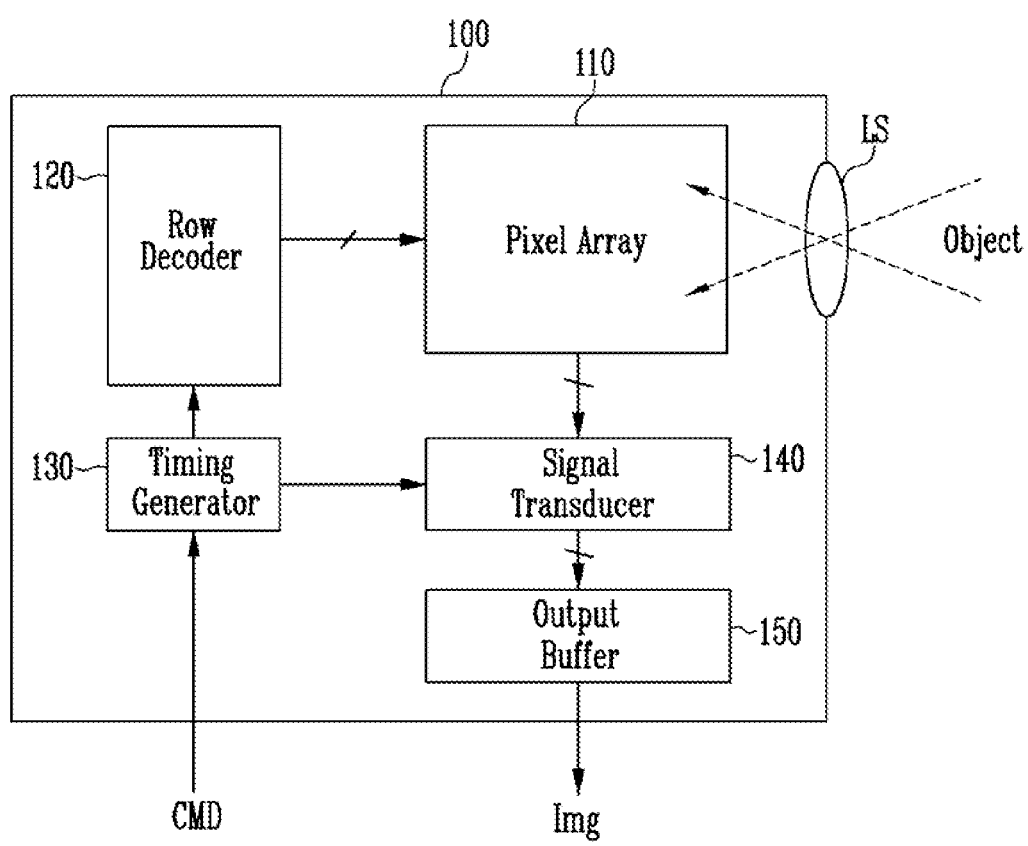
FIG. 2 is a diagram illustrating an image sensor in accordance with an embodiment of the present disclosure.

FIG. 2 is a diagram illustrating an image sensor in accordance with an embodiment of the present disclosure.

Referring to FIG. 2, the image sensor 100 may include an optical lens LS, a pixel array 110, a row decoder 120, a timing generator 130, a signal transducer 140, and an output buffer 150.

The optical lens LS may refract light reflected from an object. The light refracted through the optical lens LS may advance toward the pixel array 110. That is, the optical lens LS may refract incident light to each of pixels of the pixel array 110. The optical lens LS may be one of one lens or an assembly of a plurality of lenses, arranged on an advancing path of light. Also, the optical lens LS may include an assembly of micro lenses. The object may include at least one of various elements such as a thing, an animal, a person, and a background, which exist at the outside.

The pixel array 110 may generate an electrical signal representing an intensity or amount of exposed light.

To this end, the pixel array 110 may include a plurality of cells. The plurality of cells may be arranged in a row direction and a column direction. The plurality of cells included in the pixel array 110 may correspond to a plurality of pixels included in an image. The plurality of cells may be ones arranged in a physical area, and the plurality of pixels may be ones arranged in a digital area. The cell and the pixel may have a corresponding relationship at the same arrangement position. For example, a pixel (x, y) of the image may correspond to a cell (x, y) of the pixel array 110. Here, x and y are natural numbers. In addition, a pixel value of the pixel (x, y) of the image may be in proportion to an amount of light to which the cell (x, y) of the pixel array 110 is exposed. A color with respect to the pixel (x, y) of the image may be the same color as that of a color filter included in the cell (x, y) of the pixel array 110.

Each cell may include a color filter and a sensing circuit. The color filter may be disposed on the top of the sensing circuit. Light may pass through the color filter and then reach the sensing circuit during an exposure time. The cell may be designated as a red cell, a blue cell, a yellow cell, or the like according to a color of the color filter.

The sensing circuit may include a photo sensing element. The photo sensing element may generate an electrical signal by using a photoelectric effect, when light is incident. For example, the photo sensing element may be implemented as various semiconductor elements such as a pn-junction photo diode, a Positive-Intrinsic-Negative (PIN) photo diode, an Avalanche Photo Diode (APD), and a photo transistor.

The color filter may be one of a red color filter, a yellow color filter, and a blue color filter. The red color filter may allow light representing a red color to be transmitted therethrough by filtering incident light. The yellow color filter may allow light representing a yellow color to be transmitted therethrough by filtering incident light. The blue color filter may allow light representing a blue color to be transmitted therethrough by filtering incident light. However, this is merely an embodiment, and the yellow color filter may be variously modified as a white color filter, a cyan color filter, and the like.

A plurality of color filters may be repeatedly arranged according to a color pattern. This will be described with reference to FIG. 4.

The row decoder 120 may select a cell located on a row corresponding to an address in response to the address and a control signal, which are output from the timing generator 130. Meanwhile, the timing generator 130 may set an exposure time of each cell. In an embodiment, the timing controller 130 set an exposure time of each cell under the control of the controller 200. For example, the timing generator 130, when a control command CMD is received from the controller 200, may change an exposure time of the first pixels to a first exposure time, and change an exposure time of the second pixels to a second exposure time.

The signal transducer 140 may acquire a pixel value of each of the plurality of pixels, based on each of signals output from the pixel array 110. The signal transducer 140 may transfer, to the output buffer 150, pixel values of pixels corresponding to a selected row under the control of the timing generator 130.

The output buffer 150 may store pixel values of pixels, which are sequentially transferred from the signal transducer 140, and output an image Img including the pixel values of the pixels.

Meanwhile, a pixel value of a pixel may be acquired based on an amount of light incident onto a cell corresponding to the pixel during an exposure time set with respect to the pixel. For example, the pixel value of the pixel may be in proportion to a quantity of charges accumulated by light exposed during the exposure time set with respect to the pixel.

In a specific example, the cell may generate a current having a level corresponding to an intensity of incident light through the sensing circuit. The cell may accumulate charges through a current generated during an exposure time. The charges may be accumulated in the sensing circuit. The cell may generate a voltage having a level in proportion to a quantity of the accumulated charges through the sensing circuit. The level of the voltage generated in the cell may represent a pixel value of a pixel having the same arrangement position as the cell.

Meanwhile, when the quantity of charges accumulated in a cell reaches a maximum limit value, any charge is not accumulated any more even when the corresponding cell is exposed to light. A pixel value of a pixel having the same arrangement position as the corresponding cell may converge on the maximum limit value. Such a pixel may be defined as a saturated pixel. When a saturated pixel exists among pixels included in an image, the color reproducibility of the image may be deteriorated. In an embodiment, the electronic apparatus 10 may determine a pixel having a pixel value exceeding a threshold value as the saturated pixel. The threshold value may be less than or equal to the limit value, and the threshold value may be preset.

In an embodiment, the image sensor 100 may perform black level compensation. Specifically, the image sensor 100 may compensate for a pixel value corresponding to a dark current with all pixels. The dark current is irrelevant to light, and may be a current generated due to temperature, or the like. That is, this is because a pixel value corresponding to the dark current may be added in a pixel value of all the pixels. The image Img output from the image sensor 100 may be one in which the pixel value corresponding to the dark current is compensated.

For example, the image sensor 100 may subtract the pixel value corresponding to the dark current from a pixel value of each of the plurality of pixels. In an example, the pixel value corresponding to the dark current may be 64. Meanwhile, the pixel value corresponding to the dark current may have different values according to a structure, material, and the like of the image sensor 100.

The dark current may be measured in various manners. For example, the image sensor 100 may include a black cell. The black cell may include a color filter of a black color, which is used to block light, and a sensing circuit formed on the bottom of the color filter of the black color. The dark current may be a current measured in the sensing circuit of the black cell. In another example, the dark current may be a current measured in a sensing circuit of a red cell, a blue cell, a yellow cell, or the like under a darkroom environment in which light is blocked.

Figure 3:
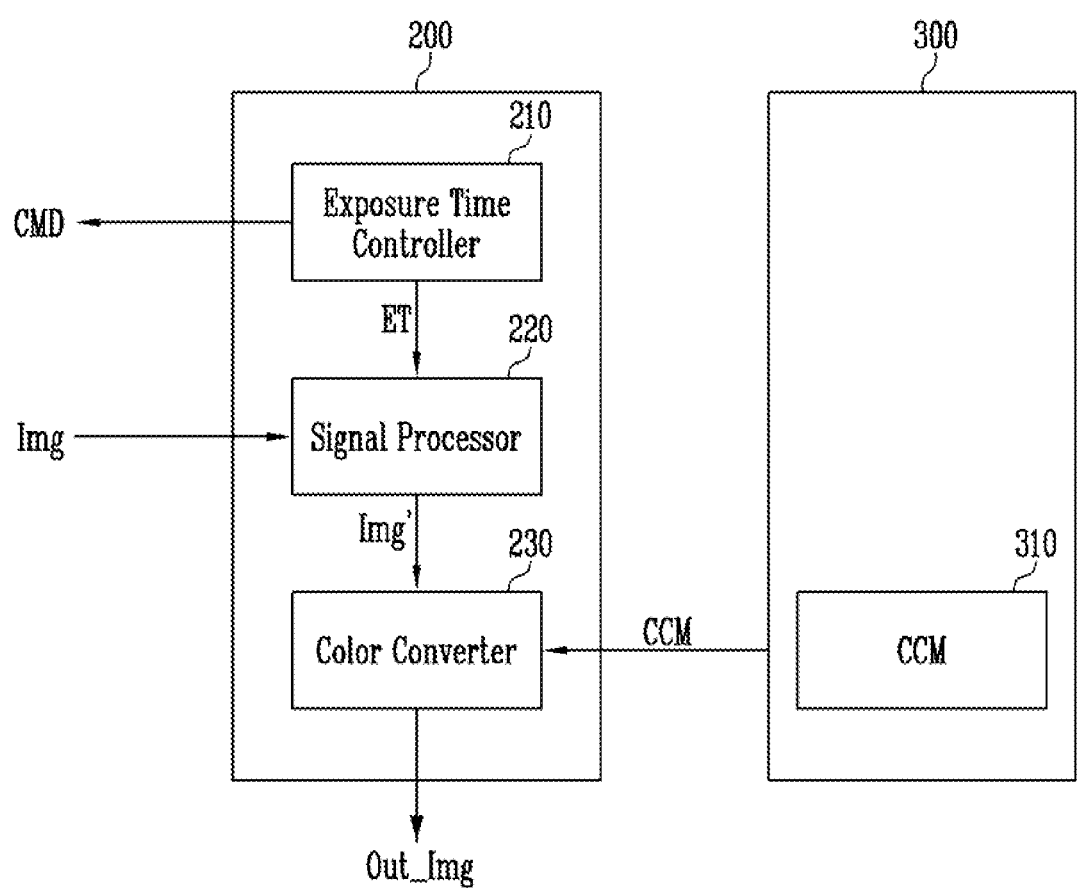
FIG. 3 is a diagram illustrating a controller in accordance with an embodiment of the present disclosure.

FIG. 3 is a diagram illustrating a controller in accordance with an embodiment of the present disclosure.

Referring to FIG. 3, the controller 200 may acquire an image Img from the image sensor 100. The image Img may include a plurality of pixels. The image Img may include a plurality of pixel values of the plurality of pixels. The plurality of pixels may include first pixels and second pixels.

A color of the first pixels may be equal to that of the second pixels. In an embodiment, the color of the first pixels and the second pixels may be yellow or white. That is, the first pixels and the second pixels may all be yellow pixels. Alternatively, the first pixels and the second pixels may all be white pixels.

A first exposure time may be set with respect to the first pixels. Each of the first pixels may have a pixel value acquired during the first exposure time. A second exposure time may be set with respect to the second pixels. Each of the second pixels may have a pixel value acquired during the second exposure time. The second exposure time may be a time longer than the first exposure time.

In an embodiment, the plurality pixels may be arranged such that a pattern according to colors of pixels is repeated for every grid area in the image Img. That is, the first pixels may be arranged to have the same distance. That is, the first pixels may be arranged at the same distance in the image Img.

In accordance with an embodiment of the present disclosure, the ratio of a number of the first pixels and a number of the second pixels may be 1:3. Meanwhile, in another embodiment, the ratio of a number of the first pixels and a number of the second pixels may be 1:7. This is because it is likely that noise will occur in a pixel since the first exposure time is relatively short, and it is likely that a pixel will be saturated since the second exposure time is relatively long. Therefore, it is necessary to control the ratio of a number of pixels with respect to which the first exposure time is set and a number of pixels with respect to which the second exposure time is set.

In an embodiment, the second exposure time may be set with respect to the other pixels except the first pixels and the second pixels among the plurality of pixels. That is, each of the other pixels may have a pixel value acquired during the second exposure time. However, this is merely an embodiment, and different exposure times may be set with respect to the other pixels. Meanwhile, a color of each of the other pixels may be red or blue. That is, each of the other pixels may be a red pixel or a blue pixel. Each of the other pixels may be a red pixel or a blue pixel at a ratio of 1:1.

The controller 200 may acquire a corrected image Img' obtained by correcting the image Img, based on the first exposure time and the second exposure time. The corrected image Img' is obtained by correcting a pixel value of a selected pixel among the plurality of pixels included in the image Img. That is, the corrected image Img' may include a corrected pixel value of the selected pixel among the plurality of pixels included in the image Img.

Specifically, the controller 200 may correct pixel values of the first pixels, based on the ratio of the first exposure time and the second exposure time. Also, the controller 200 may detect a saturated pixel having a pixel value exceeding a threshold value among the second pixels. Also, the controller 200 may correct the pixel value of the saturated pixel by using a corrected first pixel value of a first pixel closest to the position of the saturated pixel among the first pixels.

The controller 200 may output an output image Out_Img, based on the corrected image Img'. Specifically, the controller 200 may output the output image Out_Img, based on corrected first pixel values of the first pixels and a corrected saturated pixel value of the saturated pixel.

In a specific embodiment, the controller 200 may include an exposure time controller 210, a signal processor 220, and a color converter 230.

The exposure time controller 210 may set (or adjust) an exposure time of at least one pixel among the plurality of pixels. Specifically, the exposure time controller 210 may set an exposure time of a selected pixel. That is, the exposure time controller 210 may change the exposure time of the selected pixel. For example, the exposure time controller 210 may provide the image sensor 100 with an address of the selected pixel, an exposure time, and a control command for setting the exposure time. In response thereto, the timing generator 130 of the image sensor 100 may set the exposure time of the pixel selected by the address, based on the address and the control command CMD. Also, the image sensor 100 may acquire the pixel value of the pixel according to the exposure time set with respect to the pixel. The image sensor 100 may output the image Img including the pixel values of the plurality of pixels.

In an embodiment, the exposure time controller 210 may transmit, to the image sensor 100, the control command CMD for setting an exposure time of the first pixels as the first exposure time and setting an exposure time of the second pixels as the second exposure time. The first exposure time may be a time shorter than the second exposure time.

The exposure time controller 210 may transfer exposure time information ET to the signal processor 220. The exposure time information ET may be information representing an exposure time set with respect to each of the pixels included in the image Img.

The signal processor 220 may acquire the image Img. For example, the signal processor 220 may receive the image Img from the image sensor 100.

The signal processor 220 may acquire the exposure time information ET. For example, the signal processor 220 may receive the exposure time information ET from the exposure time controller 210. In another example, the signal processor 220 may receive the exposure time information ET from the image sensor 100. The exposure time information ET may include an exposure time set with respect to each of the plurality of pixels. The exposure time may be one of the first exposure time and the second exposure time longer than the first exposure time.

The signal processor 220 may acquire the corrected image Img', based on the exposure time information ET and the image Img. The corrected image Img' may be one obtained by correcting pixel values of the first pixels included in the image Img and a saturated pixel value of the saturated pixel. That is, the signal processor 220 may acquire the corrected image Img' including corrected first pixel values and a corrected saturated pixel value. In an embodiment, the image Img and the corrected image Img' may include a pixel value with respect to a yellow color, a pixel value with respect to a red color, and a pixel value with respect to a blue color. In another embodiment, the image Img and the corrected image Img' may include a pixel value with respect to a white color, a pixel value with respect to a red color, and a pixel value with respect to a blue color.

Specifically, the signal processor 220 may correct the pixel values of the first pixels by using a ratio of the first exposure time set with respect to the first pixels and the second exposure time set with respect to the second pixels. That is, the signal processor 220 may acquire corrected first pixel values obtained by correcting the pixel values of the first pixels. For example, the ratio of the first exposure time and the second exposure time may be a value obtained by dividing the first exposure time into the second exposure time. The signal processor 220 may correct the pixel values of the first pixels by collectively multiplying the pixel values of the first pixels by the ratio of the first exposure time and the second exposure time.

Also, the signal processor 220 may compare each of the pixel values of the second pixels with a threshold value, and detect, as the saturated pixel, a second pixel having a pixel value exceeding the threshold value among the second pixels. That is, the saturated pixel may represent a pixel which has a pixel value exceeding the threshold value since the saturated pixel has a long exposure time, and has saturated brightness corresponding to the pixel value. The threshold value may be a value predetermined based on a maximum limit value in a range of data bits allocated as the pixel value. For example, the threshold value may be a value corresponding to 90%, 95% or the like of the maximum limit value. The word "predetermined" as used herein with respect to a parameter, such as a predetermined value, distance, constant value, row, or column, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Also, the signal processor 220 may correct the pixel value of the saturated pixel by using a corrected first pixel value of at least one most adjacent first pixel (or at least one nearest first pixel) having a distance closest to the saturated pixel among the first pixels. That is, the signal processor 220 may acquire a corrected saturated pixel value by using a corrected first pixel value corresponding to the at least one first pixel having the distance closest to the saturated pixel among the corrected first pixel values. The saturated pixel and the first pixel may be pixels of the same color. The saturated pixel may be a pixel with respect to which the second exposure time is set, and the first pixel may be a pixel with respect to which the first exposure time is set.

Specifically, the signal processor 220 may select first pixels which have the same color as the saturated pixel among the plurality of pixels included in the image and with respect to which the first exposure time is set. The signal processor 220 may calculate a distance value between the position of each of the selected first pixels and the position of the saturated pixel, and identify, as a most adjacent first pixel, at least one pixel having the smallest distance value among the calculated distance values. That is, the at least one most adjacent first pixel may represent at least one first pixel located at the closest distance from the position of the saturated pixel among the first pixels for which the first exposure time is set.

The signal processor 220 may correct the pixel value of the saturated pixel by using at least one most adjacent first pixel. The number of the at least one most adjacent first pixel may be one or plural. When the number of the at least one most adjacent first pixel is one, the signal processor 220 may correct the pixel value of the saturated pixel to be equal to a corrected first pixel value of the most adjacent first pixel. That is, the signal processor 220 may replace the pixel value of the saturated pixel with a pixel value of a first pixel closest to the position of the saturated pixel.

In an embodiment, when the number of the at least one most adjacent first pixel is plural, the signal processor 220 may correct the pixel value of the saturated pixel to become an average value or median value of corrected first pixel values of the plurality of most adjacent first pixels. However, this is merely an embodiment, and the pixel value of the saturated pixel may be corrected as various pixel values, based on a corrected first pixel value of at least one first pixel located within a predetermined distance from the position of the saturated pixel.

The signal processor 220 may acquire a corrected image Img' including pixel values of the other pixels except the first pixels and the saturated pixel, the corrected first pixel value of the first pixels, and the corrected saturated pixel value of the saturated pixel. That is, the corrected image Img' may be one obtained by correcting pixel values of some pixels in the image Img. The some pixels may include the first pixels and the saturated pixel. The color arrangement of pixels of the image Img and the corrected image Img' may be equally maintained.

The signal processor 220 may transfer the corrected image Img' to the color converter 230.

The color converter 230 may acquire an output image Out_Img by applying a color conversion matrix (CCM) 310 to the corrected image Img'. The color conversion matrix 310 may represent a matrix for acquiring the output image Out_Img obtained by converting a color of the pixels included in the corrected image Img' into another color. The output image Out_Img may include a pixel value with respect to a green color, a pixel value with respect to a red color, and a pixel value with respect to a blue color. The color of the pixels included in the output image Out_Img may be equal to that of pixels constituting a display.

The color converter 230 may generate the output image Out_Img including pixels of the green color, which correspond to the positions of the first pixels and the second pixels by applying the color conversion matrix 310 to the plurality of pixels included in the corrected image Img'. That is, the color converter 230 may acquire the output image Out_Img through matrix calculation of the pixel value with respect to one of the yellow color and the white color, the pixel value with respect to the red color, and the pixel value with respect to the blue color, and the color conversion matrix.

In an embodiment, the electronic apparatus 10 may further include a memory 300. The memory 300 may store the color conversion matrix 310. When the corrected image Img' is received from the signal processor 220, the color converter 230 may request the color conversion matrix 310 to the memory 300. The color converter 230 may receive a signal CCM representing the color conversion matrix 310 from the memory 300. However, this is merely an embodiment, and the color conversion matrix 310 may be stored in a memory included in the controller 200.

As described above, in accordance with the present disclosure, in an embodiment, there can be provided an electronic apparatus and an operating method of the electronic apparatus, which can improve the color reproducibility of an image while reducing noise of the image. Hereinafter, an embodiment will be described with reference to the accompanying drawings.

Figure 4:
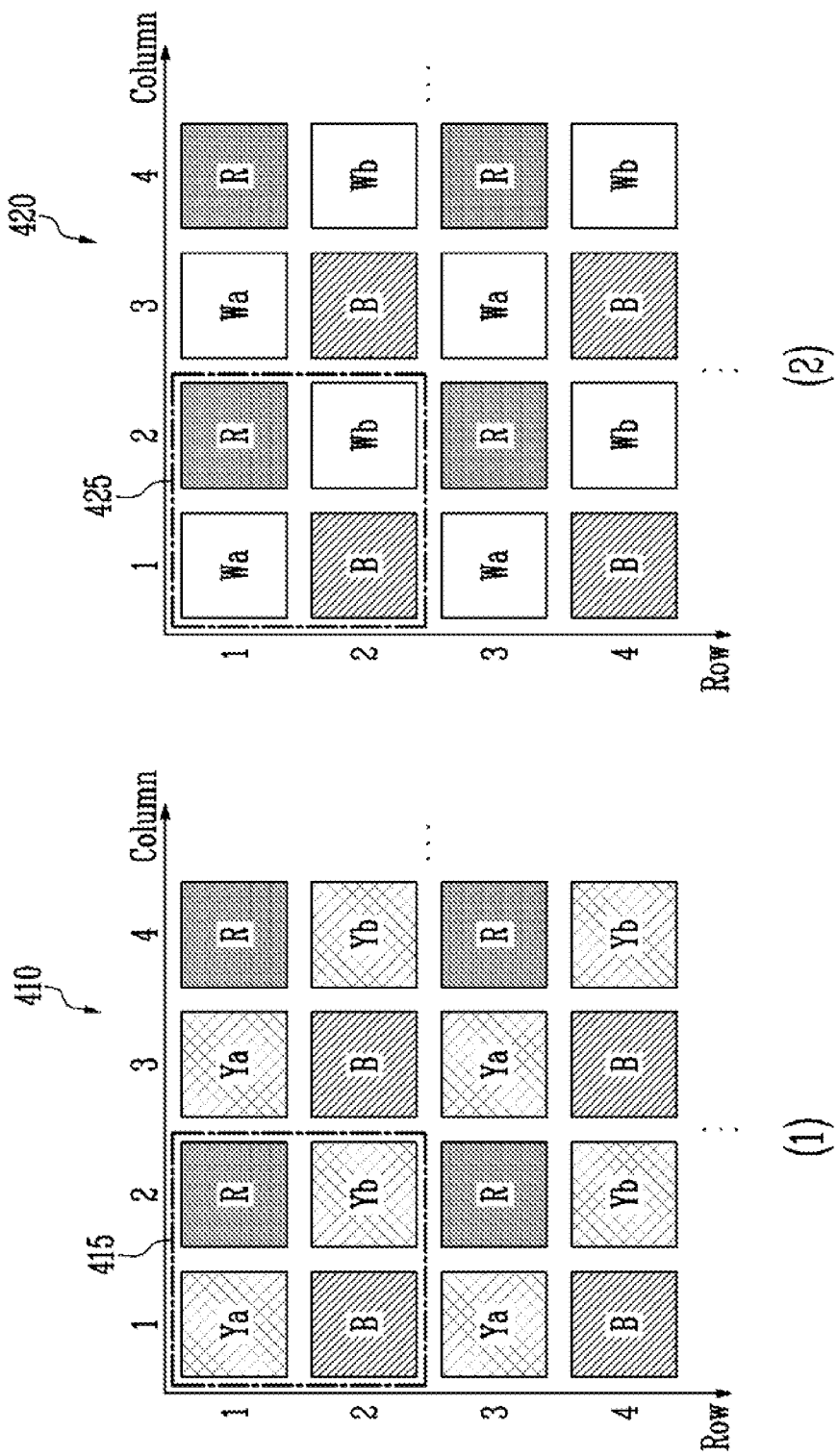
FIG. 4 is a diagram illustrating an image in accordance with an embodiment of the present disclosure.

FIG. 4 is a diagram illustrating an image in accordance with an embodiment of the present disclosure.

Referring to (1) and (2) of FIG. 4, the image sensor 100 in accordance with the embodiment of the present disclosure may acquire images 410 and 420 including a plurality of pixels. Some pixels are represented in the images 410 and 420 of (1) and (2) of FIG. 4, and the images 410 and 420 may further include other pixels of which the same arrangement is repeated.

The image 410 or 420 may include a plurality of pixels. The plurality of pixels may be arranged in a column direction and a row direction. The plurality of pixels may be distinguished from each other according to colors of the plurality of pixels.

The plurality of pixels may be arranged such that a pattern according to colors of pixels is repeated for every grid area 415 or 425. Specifically, the image 410 or 420 may include a plurality of grid areas 415 or 425. The grid area 415 or 425 may include a plurality of pixels arranged according to the pattern.

In an embodiment, the pattern may be a Bayer pattern. The Bayer pattern may be one in which pixels of the same color are arranged at positions located in diagonal directions and pixels of different colors are located at the other positions.

In an embodiment, as shown in (1) of FIG. 4, the grid area 415 may include a first yellow pixel Ya, a red pixel R, a blue pixel B, and a second yellow pixel Yb, which are arranged in 2×2. The first yellow pixel Ya and the second yellow pixel Yb, which have the same yellow color, may be arranged at positions (1, 1) and (2, 2) in a diagonal direction. The red pixel R and the blue pixel B, which have different colors, may be arranged at positions (1, 2) and (2, 1) in a diagonal direction. The image 410 may have a pattern in which the grid area 415 is repeated in column and row direction.

In an embodiment, as shown in (2) of FIG. 4, the grid area 425 may include a first white pixel Wa, a red pixel R, a blue pixel B, and a second white pixel Wb, which are arranged in 2×2. The first white pixel Wa and the second white pixel Wb, which have the same white color, may be arranged at positions (1, 1) and (2, 2) in a diagonal direction. The red pixel R and the blue pixel B, which have different colors, may be arranged at positions (1, 2) and (2, 1) in a diagonal direction. The image 420 may have a pattern in which the grid area 425 is repeated in column and row directions.

Meanwhile, an arrangement and colors of the plurality of pixels included in the image 410 or 420 may be determined by those of the plurality of cells included in the pixel array 110. For example, the arrangement and colors of the plurality of pixels may be equal to those of the plurality of cells.

Hereinafter, for convenience of description, it is assumed and described that an image Img includes the first yellow pixel Ya, the red pixel R, the blue pixel B, and the second yellow pixel Yb, like the image 410 shown in (1) of FIG. 4, and has an arrangement pattern of the image 410.

Figure 5A:
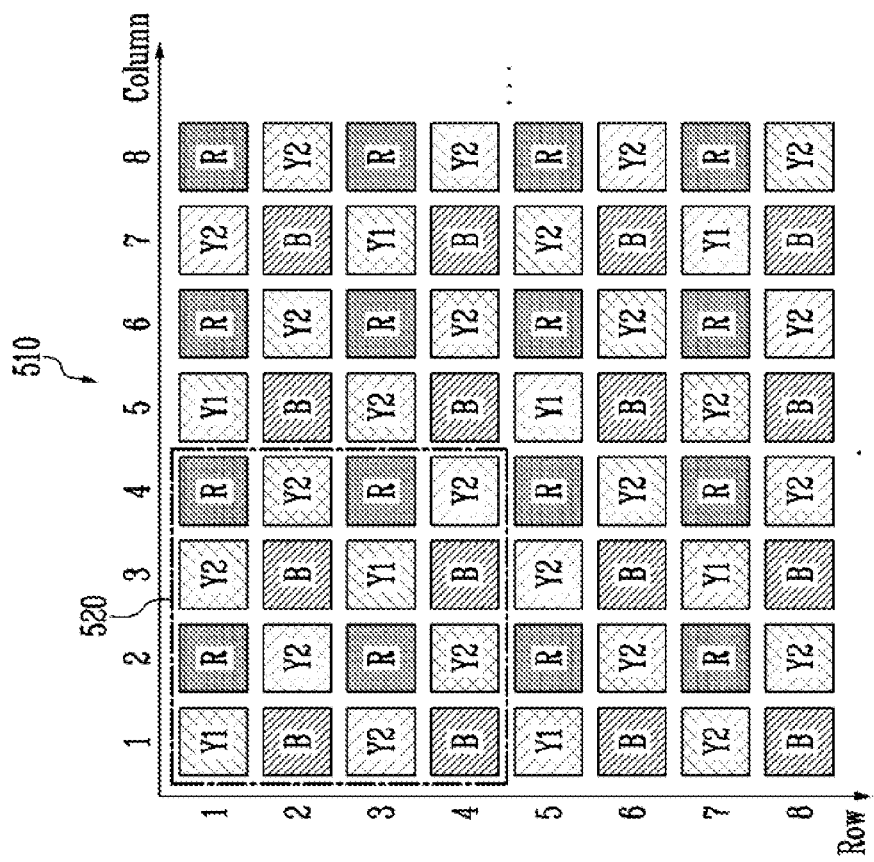
FIGS. 5A and 5B are diagrams illustrating an image to which different exposure times are applied in accordance with an embodiment of the present disclosure.
Figure 5B:
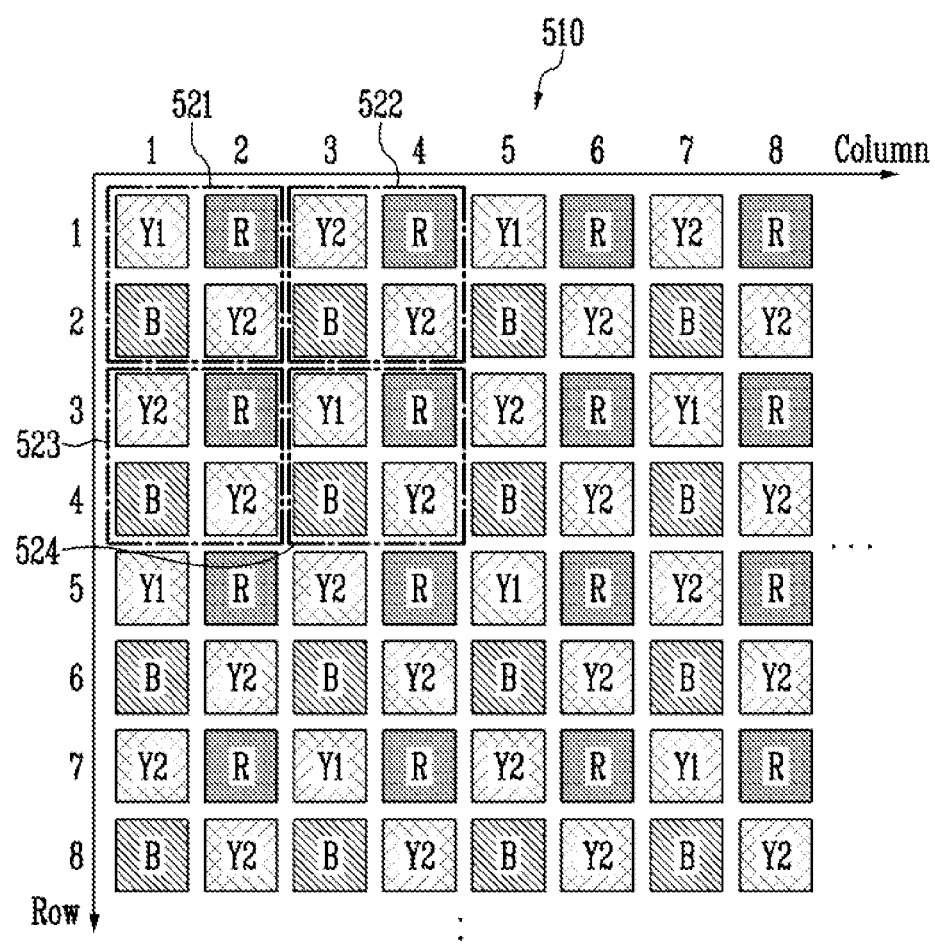

FIGS. 5A and 5B are diagrams illustrating an image to which different exposure times are applied in accordance with an embodiment of the present disclosure.

Referring to FIGS. 5A and 5B, the controller 200 may acquire an image 510 through the image sensor 100. The image 510 may include a plurality of pixels. The plurality of pixels may include a red pixel R, a blue pixel B, and yellow pixels Y1 and Y2. An individual exposure time may be set with respect to each of the plurality of pixels.

The yellow pixels Y1 and Y2 may be divided into a first pixel Y1 with respect to which a first exposure time t1 is set and a second pixel Y2 with respect to which a second exposure time t2 is set. The second exposure time t2 may be set with respect to the red pixel R and the blue pixel B.

In an embodiment, first pixels Y1 included in the image 510 may be arranged to have the same distance. The distance may indicate a length (or a value) between positions (or coordinates) of two pixels. The ratio of a number of first pixels Y1 and a number of second pixels Y2 may be 1:3 (or 2:6).

Referring to (1) of FIG. 5A, in an embodiment, the image 510 may include a plurality of grid areas 520. The plurality of grid areas 520 may have the same pixel arrangement. For example, pixels arranged at the same position in the respective grid areas 520 may be pixels which have the same color and with respect to which the same exposure time is set.

Referring to (2) of FIG. 5A, the first exposure time t1 may be a time shorter than the second exposure time t2. For example, the first exposure time t1 may be a value obtained by dividing a predetermined constant value k into the second exposure time t2. The constant value k may be a value greater than 1. Meanwhile, the constant value k may represent a value obtained by dividing the first exposure time t1 into the second exposure time t2.

In an embodiment, referring to FIG. 5B, the image 510 may include a plurality of grid areas 521, 522, 523, and 524. The plurality of grid areas 521, 522, 523, and 524 may have the same pixel arrangement. For example, pixels arranged at the same position in the respective grid areas 521, 522, 523, and 524 may be pixels having the same color. The first pixel Y1 may be included in selected grid areas 521 and 524 among the plurality of grid areas 521, 522, 523, and 524 according to the ratio of the number of first pixels Y1 and the number of second pixels Y2. The selected grid areas 521 and 524 may be arranged to have the same distance.

Figure 6A:
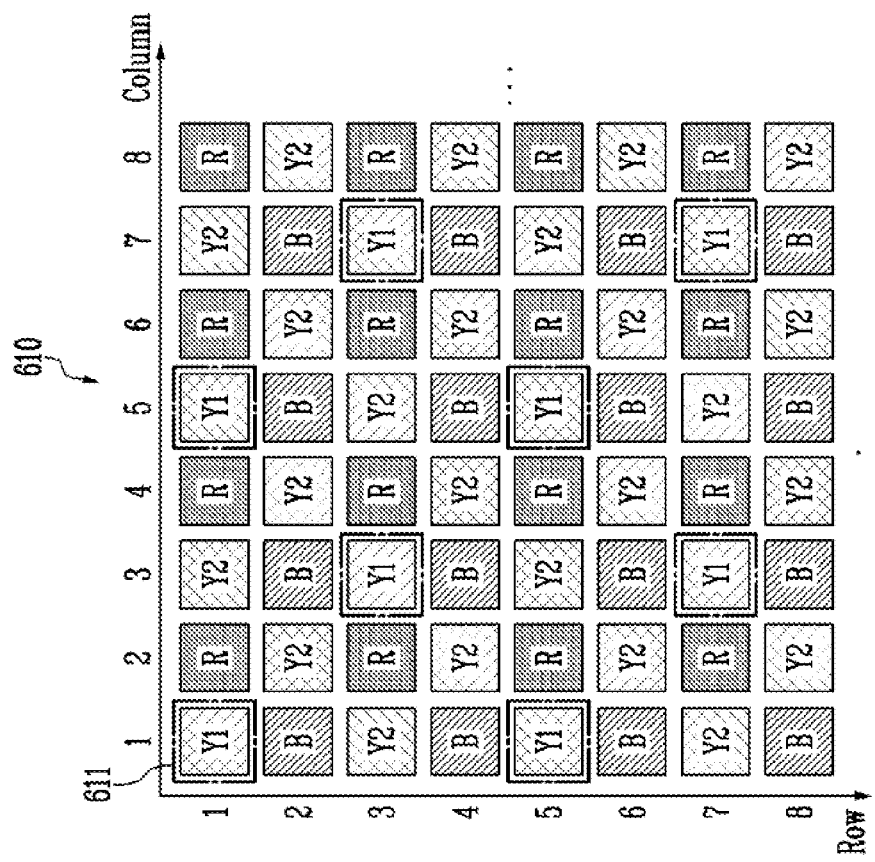
FIGS. 6A and 6B are diagrams illustrating a method of correcting a first pixel in accordance with an embodiment of the present disclosure.
Figure 6B:
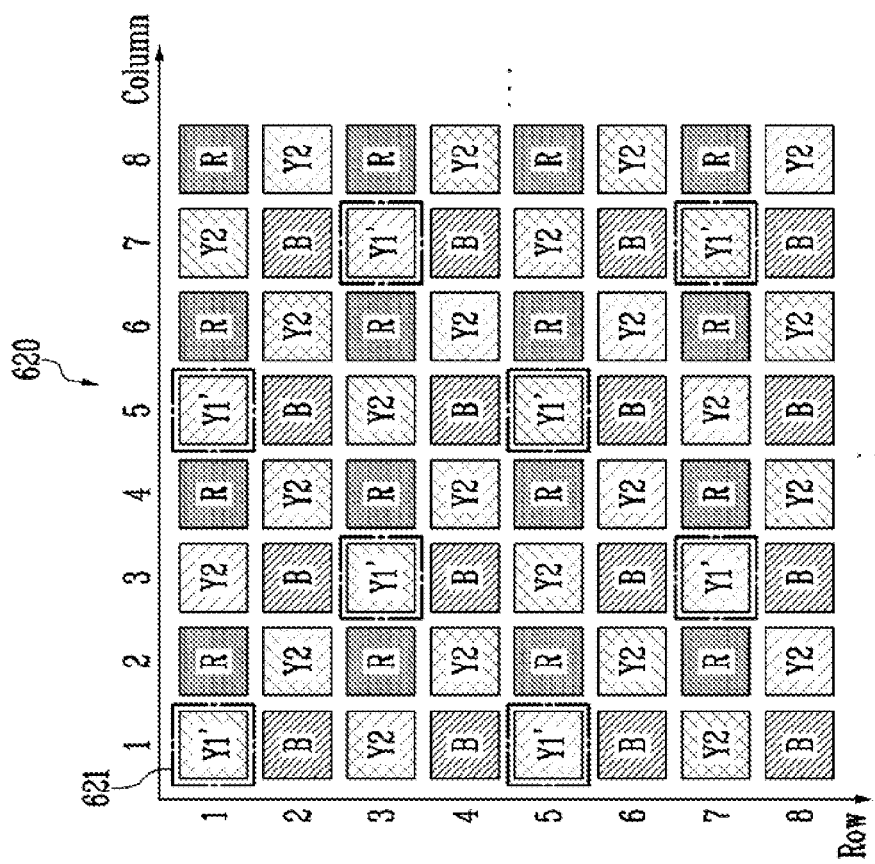

FIGS. 6A and 6B are diagrams illustrating a method of correcting a first pixel in accordance with an embodiment of the present disclosure.

Referring to FIGS. 6A and 6B, the controller 200 may correct first pixels Y1 included in an image 610, and acquire a corrected image 620 including corrected first pixels Y1'.

Specifically, the controller 200 may correct pixel values PV_Y1 of the first pixels Y1 included in the image 610, based on a ratio of a first exposure time t1 and a second exposure time t2. The ratio of the first exposure time t1 and the second exposure time t2 may represent a constant value obtained by dividing the first exposure time t1 into the second exposure time t2.

The controller 200 may acquire a corrected first pixel value PV_Y1' of a corrected pixel Y1' as a result obtained by correcting a pixel value PV_Y1 of a first pixel Y1 included in the image 610. For example, the controller 200 may acquire a corrected first pixel value PV_Y1' of a first pixel 621 at the same position (1, 1) as a first pixel 611 at the position (1, 1) including in the image 610, as a result obtained by correcting a pixel value PV_Y1 of the first pixel 611.

The controller 200 may acquire corrected first pixel values PV_Y1' of the corrected first pixels Y1' as a result obtained by multiplying the pixel values PV_Y1 of the first pixels Y1 included in the image 610 by the constant value k. The controller 200 may acquire the corrected image 620 including the corrected first pixel values PV_Y1' of the corrected first pixels Y1'. Meanwhile, the controller 200 may correct pixel value for the saturated pixel among the pixel values PV_Y2 for the second pixels Y2 included in the image 610. Each of the second pixels Y2 may be a pixel to which the second exposure time t2 is set. The saturated pixel may be corrected using a different method than the first pixel.

Figure 7A:
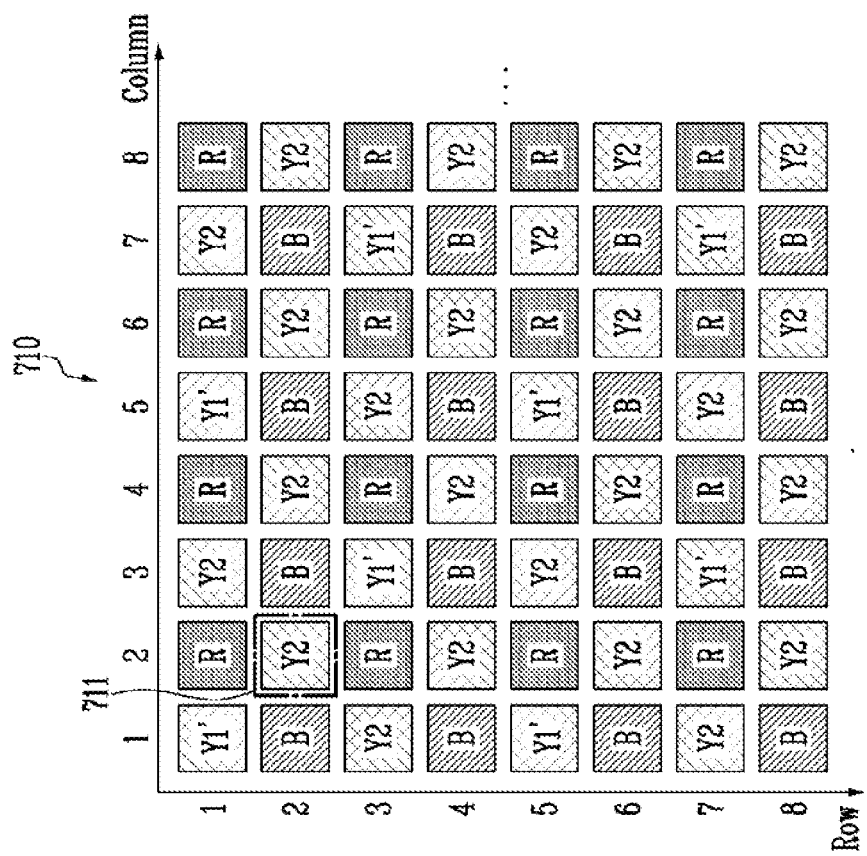
FIGS. 7A and 7B are diagrams illustrating a method of correcting a second pixel in accordance with an embodiment of the present disclosure.
Figure 7B:
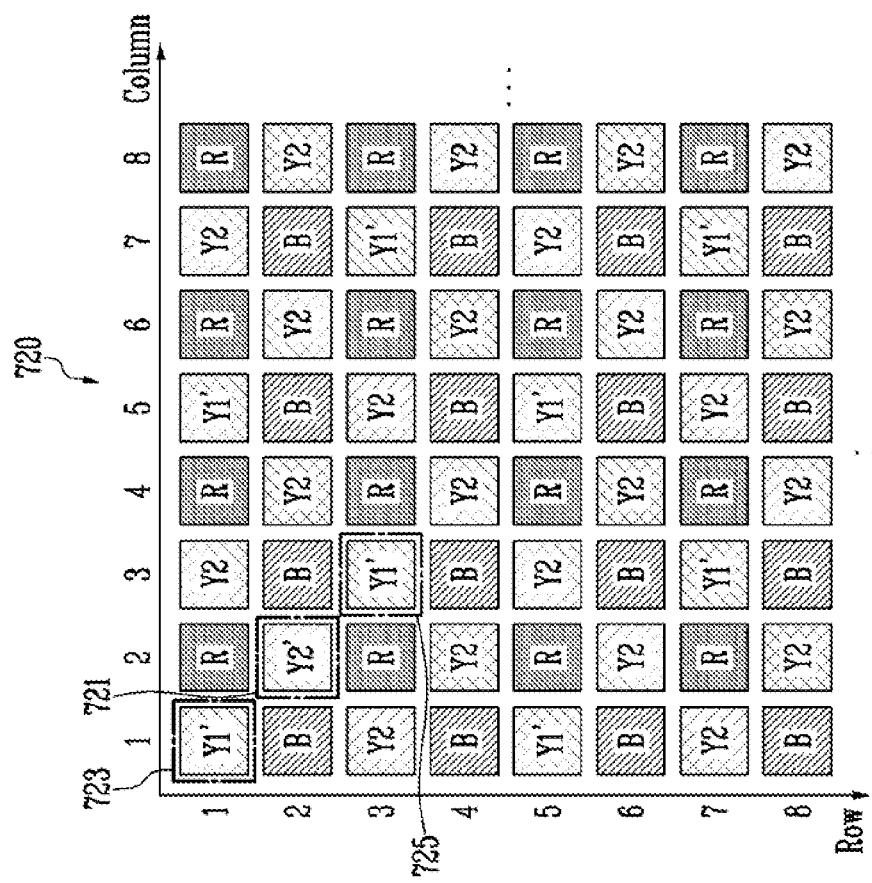

FIGS. 7A and 7B are diagrams illustrating a method of correcting a second pixel in accordance with an embodiment of the present disclosure.

Referring to FIGS. 7A and 7B, the controller 200 may detect a saturated pixel having a pixel value exceeding a threshold value among a plurality of pixels included in an image 710. As shown (1) and (2) shown in FIG. 7A, the image 710 may include corrected first pixel values PV_Y1' of corrected first pixels Y1' and second pixel values PV_Y2 of second pixels Y2. The pixel value PV_Y2 of the second pixels Y2 may be uncorrected. It is assumed that a pixel 711, 721 located at (2, 2) among second pixels Y2 is the saturated pixel having the pixel value exceeding the threshold value.

The controller 200 may correct the saturated pixel included in the image 710, and acquire a corrected image 720 including a corrected saturated pixel value PV_Y2' of a corrected saturated pixel Y2'. For example, the controller 200 may acquire the corrected saturated pixel value PV_Y2' of the corrected saturated pixel Y2' as a result obtained by correcting a pixel value PV_Y2 of the saturated pixel included in the image 710. The saturated pixel and the corrected saturated pixel Y2' may be the pixels 711, 721 at the same position.

Referring to FIGS. 7A and 7B, the controller 200 may correct the pixel value PV_Y2 of the saturated pixel by using a corrected first pixel value PV_Y1' of a first pixel 723 or 725 closest to the saturated pixel among the corrected first pixels Y1'. The arrow in (2) of FIG. 7B may indicate that the corrected saturated pixel value PV_Y2' is obtained according to an operation using the corrected first pixel value PV_Y1'. In an embodiment, the operation may be calculating an average value or a median value. The saturated pixel and the first pixel may be pixels 711, 721 of the same color. The saturated pixel may be a pixel with respect to which a second exposure time t2 is set, and the first pixel may be a pixel with respect to which a first exposure time is set.

In an embodiment, the first pixels 723 and 725 located at (1, 1) and (3, 3) closest to the position (2, 2) of the saturated pixel among the corrected first pixels Y1' are identified as the most adjacent first pixels. For example, when the number of the most adjacent first pixels is plural, the controller 200 may obtain an average value or median value of corrected first pixel values PV_Y1' of the plurality of first pixels 723 and 725 as the corrected saturated pixel value PV_Y2'.

Figure 8A:
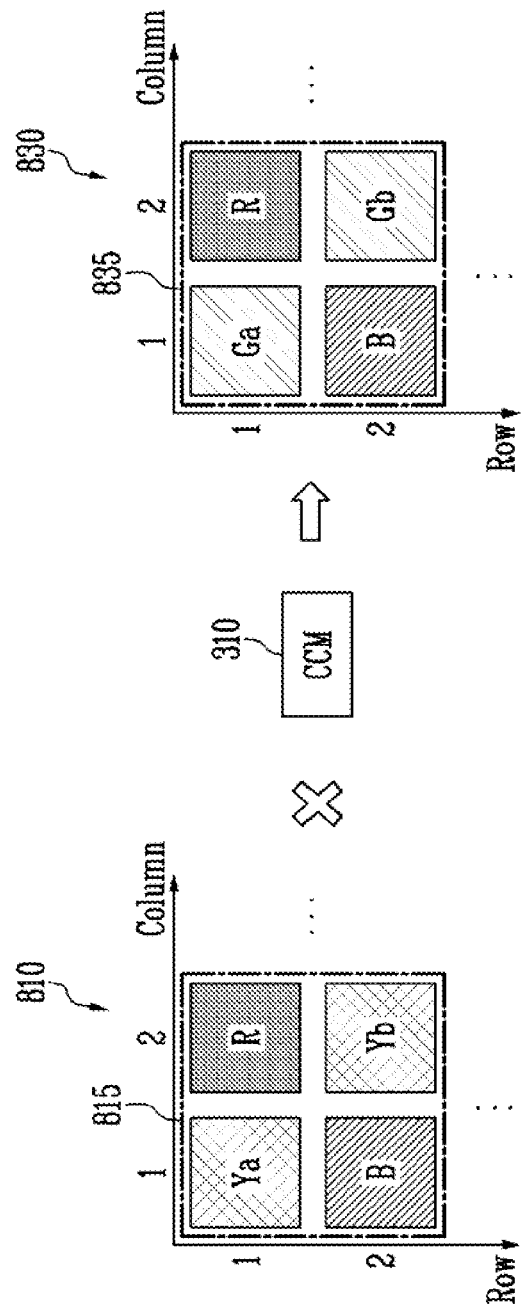

FIGS. 8A and 8B are diagrams illustrating a color conversion method in accordance with an embodiment of the present disclosure.

Referring to FIGS. 8A and 8B, the controller 200 may generate an output image 830 by applying the color conversion matrix 310 to a corrected image 810. For example, the controller 200 may acquire the output image 830 through the corrected image 810 and the color conversion matrix 310. That is, the output image 830 may be obtained by converting colors of some of the pixels included in the corrected image 810.

The color conversion matrix 310 may include parameters C11 to C44 corresponding to predetermined rows and predetermined columns. The number and values of the parameters C11 to C44 included in the color conversion matrix 310 may be changed according to colors of pixels included in the corrected image 810 and colors of pixels included in the output image 830.

The controller 200 may acquire pixel values Ga_PV_out, R_PV_out, B_PV_out, and Gb_PV_out of pixels Ga, R, B, and Gb included in a unit area 835 of the output image 830 as a result obtained by multiplying the color conversion matrix 310 by pixel values Ya_PV_in, R_PV_in, B_PV_in, and Yb_PV_in of pixels Ya, R, B, and Yb included in a unit area 815 of the corrected image 810. The controller 200 may acquire pixel values Ga_PV_out, R_PV_out, B_PV_out, and Gb_PV_out of pixels Ga, R, B, and Gb representing a converted color with respect to each unit area 835 of the output image 830 through a calculation result obtained by applying the color conversion matrix 310 to each unit area 815 of the corrected image 810.

The corrected image 810 may include the unit area 815 repeatedly arranged in row and column directions. The unit area 815 may include a first yellow pixel Ya, a red pixel R, a blue pixel B, and a second yellow pixel Yb.

The output image 830 may include the unit area 835 repeatedly arranged in row and column directions. The unit area 835 may include a first green pixel Ga, a red pixel, a blue pixel B, and a second green pixel Gb. That is, yellow pixels Ya and Yb of the corrected image 810 may be converted into green pixels Ga and Gb of the output image 830.

Figure 9B:
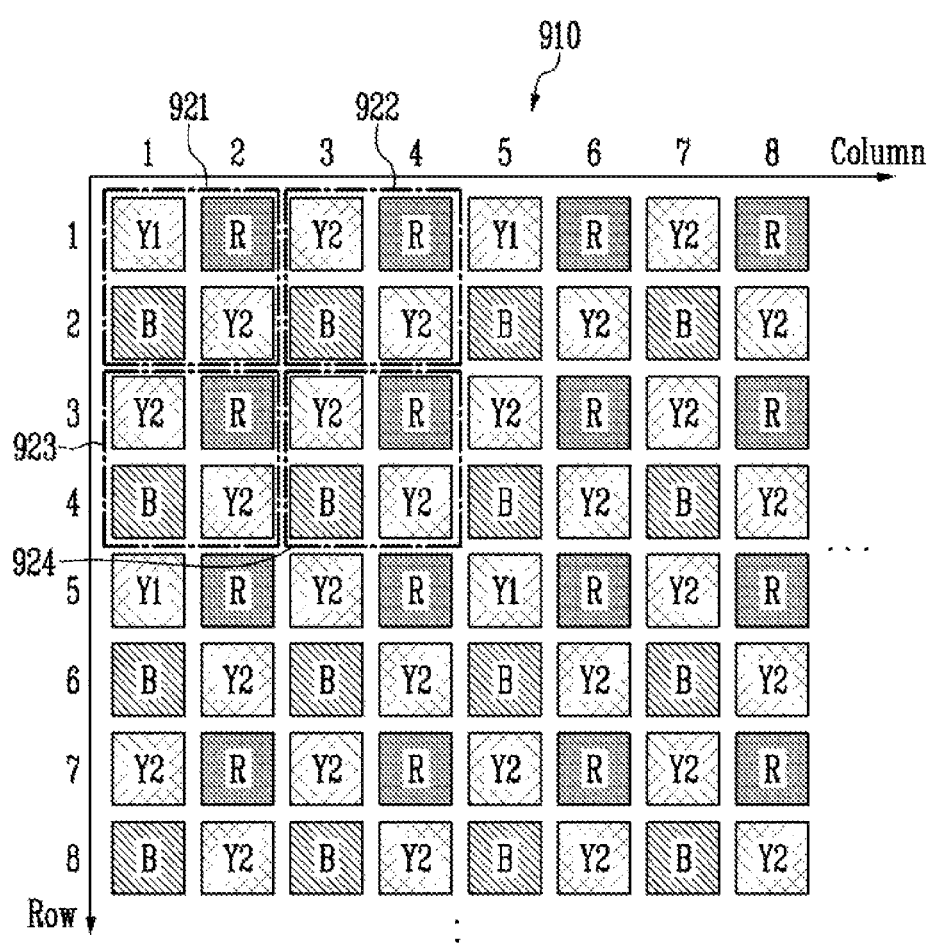

FIGS. 9A and 9B are diagrams illustrating a ratio of first pixels and second pixels in accordance with an embodiment of the present disclosure.

Referring to FIGS. 9A and 9B, the controller 200 may acquire an image 910 through the image sensor 100. The image 910 may include a plurality of pixels. The plurality of pixels may include a red pixel R, a blue pixel B, and yellow pixels Y1 and Y2. An individual exposure time may be set with respect to each of the plurality of pixels. The yellow pixels Y1 and Y2 may be divided into a first pixel Y1 with respect to which a first exposure time t1 is set and a second pixel Y2 with respect to which a second exposure time t2 is set. The second exposure time t2 may be set with respect to the red pixel R and the blue pixel B.

In an embodiment, the ratio of a number of first pixels Y1 and a number of second pixels Y2 may be 1:7.

Referring to (1) of FIG. 9A, in an embodiment, the image 910 may include a plurality of grid areas 920. The plurality of grid areas 920 may have the same pixel arrangement. For example, pixels arranged at the same position in the respective grid areas 920 may be pixels which have the same color and with respect to which the same exposure time is set. The grid area 920 having the same pixel arrangement may be repeatedly arranged in row and column directions.

Referring to (2) of FIG. 9A, the first exposure time t1 may be a time shorter than the second exposure time t2.

Referring to FIG. 9B, the image 910 may include a plurality of grid areas 921, 922, 923, and 924. The plurality of grid areas 921, 922, 923, and 924 may have the same pixel arrangement. For example, pixels arranged at the same position in the respective grid areas 921, 922, 923, and 924 may be pixels having the same color. The first pixel Y1 may be included in a selected grid area 921 among the plurality of grid areas 921, 922, 923, and 924 according to the ratio of the number of first pixels Y1 and the number of second pixels Y2. The plurality of grid areas 921, 922, 923, and 924 may be repeatedly arranged alternately in row and column directions.

Figure 10:
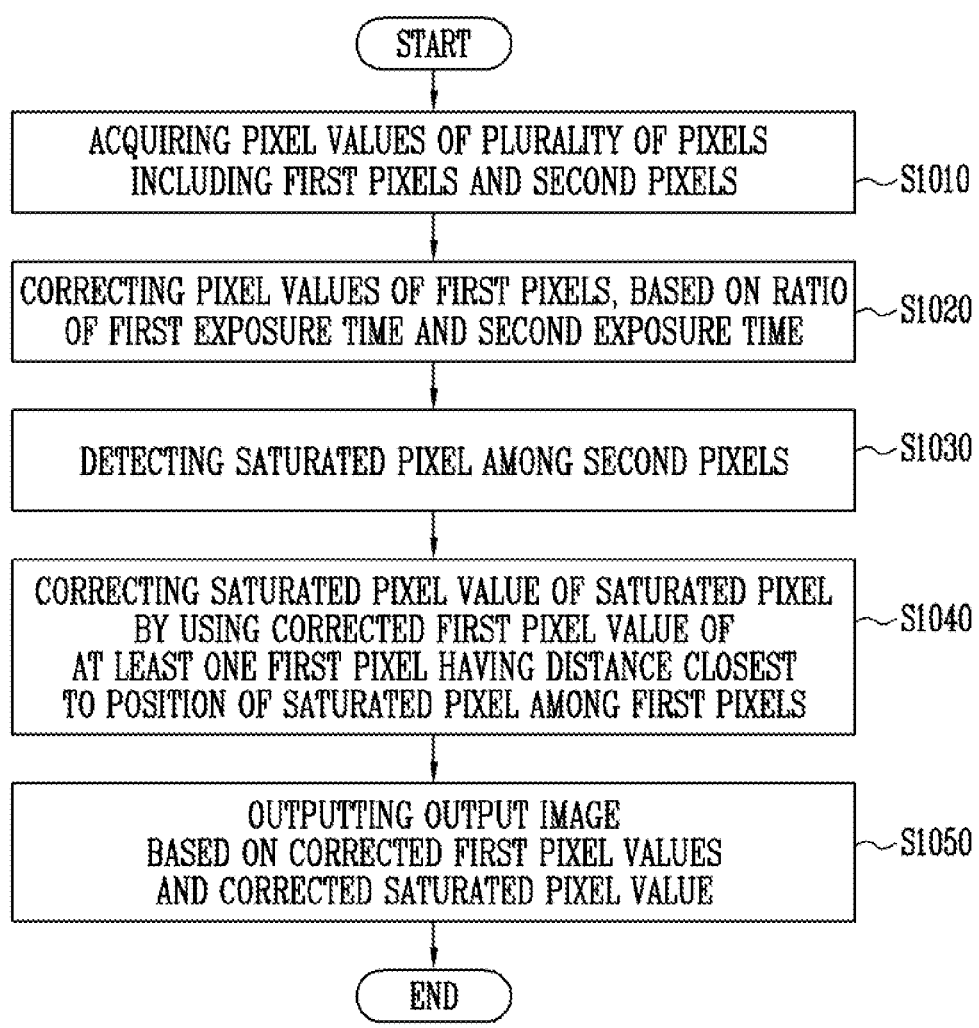
FIG. 10 is a diagram illustrating an operating method of the electronic apparatus in accordance with an embodiment of the present disclosure.

FIG. 10 is a diagram illustrating an operating method of the electronic apparatus in accordance with an embodiment of the present disclosure.

Referring to FIG. 10, the operating method of the electronic apparatus 10 may include step S1010 of acquiring pixel values of a plurality of pixels including first pixels sensed during a first exposure time and second pixels sensed during a second exposure time longer than the first exposure time, step S1020 of correcting pixel values of the first pixels, based on a ratio of the first exposure time and a second exposure time, step S1030 of detecting a saturated pixel having a pixel value exceeding a threshold value among the second pixels, step S1040 of correcting a saturated pixel value of the saturated pixel by using a corrected first pixel value of at least one first pixel having a distance closest to the saturated pixel among the first pixels, and step S1050 of outputting an output image based on the corrected saturated pixel value of the saturated pixel.

Specifically, pixel values of a plurality of pixels including first pixels and second pixels may be acquired (S1010). A first exposure time may be set with respect to the first pixels. A second exposure time may be set with respect to the second pixels. The second exposure time may be a time longer than the first exposure time. To this end, the operating method in accordance with the embodiment of the present disclosure may further include step of adjusting the first exposure time of the first pixels and the second exposure time of the second pixels. In an embodiment, the second pixel may have the same color as the first pixel.

In an embodiment, the step of acquiring the pixel values of the plurality of pixels may include acquiring a pixel value corresponding to an intensity of light incident during an exposure time set with respect to each of the plurality of pixels.

In an embodiment, the color of the first pixels and the second pixels may be yellow or white. However, this is merely an embodiment, and the color of the first pixels and the second pixels may be changed to various colors such as cyan.

In an embodiment, the plurality of pixels may be arranged in a plurality of grid areas included in an image such that pixels of the same color are located at the same position in the respective grid areas. That is, the plurality of pixels may be arranged such that a pattern according to colors of the pixels is repeated for every grid area. The image may include the plurality of grid areas arranged in a matrix form. Each of the plurality of grid areas may be an area having the same size. For example, each grid area may include pixels arranged in 2×2. First pixels included in the image may be arranged to have the same distance.

In an embodiment, the ratio of a number of first pixels and a number of second pixels may be 1:3. For example, when one grid area includes pixels arranged in 2×2, the one grid area may include one red pixel, one blue pixel, and two yellow pixels. 8 yellow pixels may be included in an area obtained by adding up grid areas of 2×2. The number of first pixels as yellow pixels with respect to the first exposure time is set may be 2, and the number of second pixels as yellow pixels with respect to the second exposure time is set may be 6.

In an embodiment, the ratio of a number of first pixels and a number of second pixels may be 1:7. 8 yellow pixels may be included in an area obtained by adding up grid areas of 2×2. The number of first pixels as yellow pixels with respect to the first exposure time is set may be 1, and the number of second pixels as yellow pixels with respect to the second exposure time is set may be 7.

In addition, the pixel values of the first pixels may be corrected based on the ratio of the first exposure time and the second exposure time (S1020). For example, the ratio of the first exposure time and the second exposure time may be a value k obtained by dividing the second exposure time by the first exposure time. A corrected first pixel value of a first pixel may be acquired by multiplying a pixel value of the first pixel by the ratio of the first exposure time and the second exposure time. That is, the pixel values of the first pixels may be corrected with values calculated through calculation of multiplying each of the pixel values of the first pixels by the ratio of the first exposure time and the second exposure time.

In addition, a saturated pixel having a pixel value exceeding a threshold value among the second pixels may be detected (S1030). That is, a second pixel having a pixel value exceeding the threshold value among the second pixels may be detected as the saturated pixel through calculation of comparing pixels values of the second pixels with the threshold value. The threshold value is a predetermined value with respect to a maximum value of the pixel values, and may be stored in the controller 200 or the memory 300. For example, if the maximum value of the pixel values is 255, then the threshold value may be one of various values including 230, 240, 250, and the like.

In addition, a saturated pixel value of the saturated pixel may be corrected by using a corrected first pixel value of a first pixel closest to the position of the saturated pixel among the first pixels (S1040).

In an embodiment, an average value or median value of a corrected first pixel value of at least one first pixel may be corrected as the saturated pixel value. In a specific embodiment, when the number of first pixels closest to the position of the saturated pixel among the first pixels is one, the pixel value of the saturated pixel may be corrected to become the same pixel value as the corrected first pixel value of the first pixel. In another embodiment, when the number of first pixels closest to the position of the saturated pixel among the first pixels is plural, the pixel value of the saturated pixel may be corrected to become an average value or median value of a corrected first pixel value of each of the plurality of first pixels.

In addition, an output image may be output based on corrected first pixel values of the first pixels and the corrected saturated pixel value of the saturated pixel (S1050).

In an embodiment, a corrected image may be acquired, which includes pixel values of the other pixels except the first pixels and the saturated pixel among the pixel values of the plurality of pixels, the corrected first pixel values of the first pixels, and the corrected saturated pixel value. The second exposure time may be set with respect to the other pixels. Each of the other pixels may have a red or blue color.

In addition, an output image including a pixel value with respect to a green color, a pixel value with respect to a red color, and a pixel value with respect to a blue color may be acquired through matrix calculation of the corrected image and a color conversion matrix.

To this end, a color conversion matrix for converting a pixel value with respect to one of a yellow color and a white color into the pixel value with respect to the green color may be stored. The color conversion matrix may be stored in the memory 300.

Figure 11:
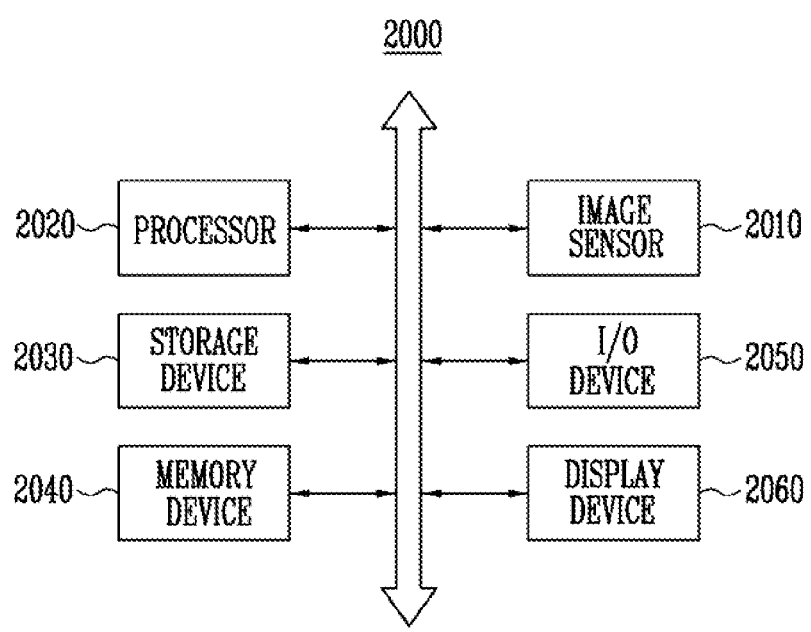
FIG. 11 is a diagram illustrating an implementation example of the electronic apparatus.

FIG. 11 is a diagram illustrating an implementation example of the electronic apparatus.

Referring to FIG. 11, the electronic apparatus 10 may be implemented as a computing system 2000. The computing system 2000 may include an image sensor 2010, a processor 2020, a storage device 2030, a memory device 2040, an input/output (I/O) device 2050, and a display device 2060. Although not shown in FIG. 11, the computing system 2000 may further include a port capable of communicating with the storage device 2030, the memory device 2040, the I/O device 2050, the display device 2060, and the like, or communicating with an external device.

The image sensor 2010 may acquire an image Img including a plurality of pixels to which an exposure time is individually applied. The image sensor 2010 may acquire a corrected image Img' obtained by correcting pixel values of a first pixel and a saturated pixel, which are included in the image Img. The image sensor 2010 may generate an output image Out_Img obtained by applying a color conversion matrix to the corrected image Img', and output the output image Out_Img. The image sensor 2010 may be connected to the processor 2020 through an address bus, a control bus, and a data bus, or a communication line different therefrom, to perform communication.

The image sensor 2010 may be implemented with a various types of packages. For example, at least some components of the image sensor 2010 may be implemented by using packages such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), or Wafer-level processed Stack Package (WSP). In some embodiments, the image sensor 2010 may be integrated together with the processor 2020 in one chip, or the image sensor 2010 and the processor 2020 may be integrated in different chips.

The processor 2020 may control overall operations of the computing system 2000. The processor 2020 may control the display device 2060 to display the output image Out_Img. The processor 2020 may store the output image Out_Img in the storage device 2030.

The processor 2020 may perform specific calculations or tasks. In accordance with an embodiment of the present disclosure, the processor 2020 may include at least one of a Central Processing Unit (CPU), an Application Processing Unit (APU), a Graphic Processing Unit (GPU), and the like.

The processor 2020 may be connected to the storage device 2030, the memory device 2040, and the I/O device 2050 through the address but, the control bus, and the data bus, to perform communication. In accordance with an embodiment of the present disclosure, the processor 2020 may also be connected to an expansion bus such as a Peripheral Component Interconnect (PCI) bus.

The storage device 2030 may store data of the output image Out_Img, or the like. The data stored in the storage device 2030 may be preserved not only when the computing system 2000 is driven but also when the computing system 2000 is not driven. For example, the storage device 2030 may be configured with at least one all types of nonvolatile memory devices such as a flash memory device, a Solid State Drive (SSD), a Hard Disk Drive (HDD), and an optical disk.

The memory device 2040 may store data of the output image Out_Img, or the like. The memory device 2040 may temporarily store data to be processed by the processor 2020 or temporarily store data processed by the processor 2020. The data stored in the memory device 2040 may be preserved only when the computing system 2000 is driven. Alternatively, the data stored in the memory device 2040 may be preserved not only when the computing system 2000 is driven but also when the computing system 2000 is not driven. For example, the memory device 2040 may include volatile memory devices such as a Dynamic Random Access Memory (DRAM) and a Static Random Access Memory (SRAM), and nonvolatile memory devices such as an Erasable Programmable Read Only Memory (EPROM), an Electrically Erasable Programmable Read Only Memory (EEPROM), and a flash memory device.

The I/O device 2050 may include an input device and an output device. The input device is a device capable of inputting a command of a user through interaction, and may be implemented as, for example, a keyboard, a keypad, a mouse, a microphone, or the like. The output device is a device capable of outputting data, and may be implemented as a printer, a speaker, or the like.

The display device 2060 is a device for visually outputting data of the output image Out_Img, or the like. To this end, the display device 2060 may be implemented with various types of displays such as a Liquid crystal Display (LCD) for controlling the molecular arrangement of liquid crystals, using a separate backlight unit (e.g., a light emitting diode (LED), etc.) as a light source, thereby adjusting a degree to which light emitted from the backlight unit is transmitted through the liquid crystals (brightness of light or intensity of light), and a display using, a light source, a self-luminous element (e.g., a mini LED having a size of 100 to 200 μm, a micro LED having a size of 100 μm or less, an Organic LED (OLED), a Quantum dot LED (QLED), and the like). The display device 2060 may emit, to the outside, lights of red, green, and blue colors, which correspond to the output image Out_Img.

In accordance with the present disclosure, in an embodiment, there can be provided an electronic apparatus and an operating method of the electronic apparatus, which can improve color reproducibility of an image while reducing noise.

While the present disclosure has been shown and described with reference to certain examples of embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described examples of embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the examples of embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An electronic apparatus comprising:
   an image sensor configured to acquire pixel values of first pixels sensed during a first exposure time and second pixels sensed during a second exposure time longer than the first exposure time;
   a controller configured to output an output image acquired based on the pixel values of the first pixels and a corrected saturated pixel value obtained by correcting a pixel value of a saturated pixel having a pixel value exceeding a threshold value among the second pixels, using a pixel value of at least one first pixel having a distance closest to a position of the saturated pixel among the first pixels; and
   a memory configured to store a color conversion matrix for converting at least one of the pixel values of the first pixels and the second pixels into a pixel value corresponding to a green color,
   wherein the first pixels and the second pixels have a same color, and
   wherein each of the pixel values of the first pixels and the second pixels corresponds to one of a yellow color and a white color.

2. The electronic apparatus of claim 1, wherein the controller includes a signal processor configured to:
   acquire corrected first pixel values obtained by correcting the pixel values of the first pixels, using a ratio of the first exposure time and the second exposure time;
   acquire the corrected saturated pixel value by using a corrected first pixel value corresponding to the at least one first pixel among the corrected first pixel values; and
   acquire a corrected image including the corrected first pixel values and the corrected saturated pixel value, and
   wherein sensitivities of the first pixels and the second pixels are higher than a sensitivity of a green pixel.

3. The electronic apparatus of claim 2, wherein the signal processor acquires, as the corrected saturated pixel value, one of an average value and median value of a first pixel value corresponding to the at least one first pixel.

4. The electronic apparatus of claim 2, wherein a plurality of pixel values included in the corrected image include a pixel value corresponding to the one of the yellow color and the white color, a pixel value corresponding to a red color, and a pixel value corresponding to a blue color.

5. The electronic apparatus of claim 4, wherein the controller includes a color converter configured to acquire the output image through matrix calculation of the pixel value corresponding to the one of the yellow color and the white color, the pixel value corresponding to the red color, and the pixel value corresponding to the blue color, and the color conversion matrix.

6. The electronic apparatus of claim 1, wherein the output image includes the pixel value corresponding to the green color, a pixel value corresponding to a red color, and a pixel value corresponding to a blue color.

7. The electronic apparatus of claim 1, wherein a ratio of a number of the first pixels and a number of the second pixels is one of 1:3 and 1:7.

8. The electronic apparatus of claim 1, wherein the controller includes an exposure time controller configured to transmit, to the image sensor, a command for adjusting the first exposure time of the first pixels and the second exposure time of the second pixels.

9. A method of operating an electronic apparatus, the method comprising:
   acquiring pixel values of a plurality of pixels including first pixels sensed during a first exposure time and second pixels sensed during a second exposure time longer than the first exposure time, wherein the first pixels and the second pixels have a same color;
   correcting the pixel values of the first pixels, based on a ratio of the first exposure time and the second exposure time;
   detecting a saturated pixel having a pixel value exceeding a threshold value among the second pixels;
   correcting a saturated pixel value of the saturated pixel by using a corrected first pixel value of at least one first pixel having a distance closest to a position of the saturated pixel among the first pixels;
   storing a color conversion matrix for converting at least one of the pixel values of the first pixels and the second pixels into a pixel value corresponding to a green color; and
   outputting an output image based on corrected first pixel values of the first pixels and the corrected saturated pixel value, wherein each of the pixel values of the first pixels and the second pixels corresponds to one of a yellow color and a white color.

10. The method of claim 9, wherein, in the correcting of the saturated pixel value, one of an average value and median value of the corrected first pixel value of the at least one first pixel is corrected as the saturated pixel value, and
wherein sensitivities of the first pixels and the second pixels are higher than a sensitivity of a green pixel.

11. The method of claim 9, wherein the outputting of the output image includes:
acquiring a corrected image including pixel values of the other pixels except the first pixels and the saturated pixel among the pixel values of the plurality of pixels, the corrected first pixel values of the first pixels, and the corrected saturated pixel value; and
acquiring the output image including the pixel value corresponding to the green color, a pixel value corresponding to a red color, and a pixel value corresponding to a blue color through matrix calculation of the corrected image and the color conversion matrix.

12. The method of claim 9, wherein, in the correcting of the pixel values of the first pixels, the pixel values of the first pixels are corrected as values calculated through calculation of multiplying each of the pixel values of the first pixels by the ratio of the first exposure time and the second exposure time.

13. The method of claim 9, further comprising detecting, as the saturated pixel, a second pixel having a pixel value exceeding the threshold value among the second pixels through calculation of comparing the pixel values of the second pixels with the threshold value.

14. The method of claim 9, further comprising detecting, as the at least one first pixel, at least one first pixel having a minimum distance value among distance values of the saturated pixel and the first pixels.

15. The method of claim 9, further comprising adjusting the first exposure time of the first pixels and the second exposure time of the second pixels.

* * * * *